United States Patent [19]
Kamaya et al.

[11] Patent Number: 6,079,852
[45] Date of Patent: Jun. 27, 2000

[54] AUXILIARY LIGHT

[75] Inventors: Masashi Kamaya; Haruo Hyodo, both of Tokyo, Japan

[73] Assignee: PIAA Corporation, Tokyo, Japan

[21] Appl. No.: 08/869,799

[22] Filed: Jun. 5, 1997

[30] Foreign Application Priority Data

Dec. 17, 1996 [JP] Japan .................................. P8-337140

[51] Int. Cl.⁷ .................................................. F21V 14/00
[52] U.S. Cl. ........................... 362/287; 362/371; 362/427
[58] Field of Search .................................. 362/269, 287, 362/370, 371, 382, 427, 505, 523, 546, 549, 372

[56] References Cited

U.S. PATENT DOCUMENTS

| | | | |
|---|---|---|---|
| 3,543,016 | 11/1970 | Jones | 362/371 |
| 3,714,415 | 1/1973 | Stephensen | 362/370 |
| 4,449,169 | 5/1984 | Cohen | 362/269 |
| 5,528,467 | 6/1996 | Jiang | 362/546 |
| 5,676,458 | 10/1997 | Shemitz et al. | 362/372 |

*Primary Examiner*—Y. Quach
*Attorney, Agent, or Firm*—Jones & Askew, LLP

[57] ABSTRACT

An auxiliary light is provided with a housing having a light element in an inside thereof and an axially supporting portion in a side portion, and a bracket having a stand portion which is axially supported to the side portion of the housing by the axially supporting portion and a base portion which can be suitably supported to the vehicle. In this structure, a circular arc portion having a center of substantially center portion of the housing in a right and left direction is formed in both of the stand portion of the bracket and the axially supporting portion of the housing.

5 Claims, 4 Drawing Sheets

US 6,079,852

AUXILIARY LIGHT

BACKGROUND OF THE INVENTION

1. Field of the Invention

The present invention relates to an auxiliary light mounted on an automobile vehicle, particularly to a mounting apparatus for the auxiliary light.

2. Description of the Related Art

Since a housing of an auxiliary light in accordance with the related art is mounted with respect to a vehicle body of an automobile vehicle, there is a fear that a mounting position of the housing of the auxiliary light can not fit with a position of a bumper in accuracy of the locations which is similarly supported to the vehicle body.

Therefore, a gap between an edge portion of an opening of the bumper and the housing of the auxiliary light is not constant, so that there is a risk of shutting the opening of the bumper for venting an engine room in view of aerodynamics which is disposed in a position of not preferable, in addition to injuring an outward appearance thereof.

SUMMARY OF THE INVENTION

The present invention is made by taking the above described problems in the auxiliary light of the related art into consideration and an object of the present invention is to provide an auxiliary light capable of adjusting a position of a housing as possible as it can.

In order to achieve the above described object, according to a first aspect of the present invention, there is provided an auxiliary light comprising: a housing having a light element inside thereof and an axially supporting portion in a side portion thereof; and a bracket having a base portion and a stand portion standing from the base portion, the stand portion axially supporting the side portion of the housing by the axially supporting portion and the base portion being capable of being suitably supported to a vehicle body, wherein each of the stand portion of the bracket and the axially supporting portion of the housing is formed with a circular arc portion having a center of substantially center portion of the housing in a right and left direction.

In the above construction, by energizing the housing having a light element inside thereof so as to rotate in a lateral direction, since both of a stand portion of a bracket suitably supported to the vehicle body and an axially supporting portion of the housing form a circular arc shaped surface having a center in a substantially central portion of the housing in a right and left direction, the axially supporting portion of the housing rotates with respect to the stand portion of the bracket so that the auxiliary light can rotate in a desired right and left direction.

According to a second aspect of the present invention, as it depends from the first aspect, the circular arc portion formed in the axially supporting portion is a spacer plate disposed in the side portion of the housing and the circular arc portion is formed in an outer side surface of the spacer plate.

In the above construction, since the circular arc shaped curved surface is formed on the outer side surface of the spacer plate disposed in the side portion of the housing, various rotating angles can be obtained only by replacing the spacer plate and the bracket without replacing the housing so that the housing has a flexibility.

According to a third aspect of the present invention, as it depends from the second aspect, the spacer plate is formed with a step portion with which an end of the stand portion of the bracket engages.

In the above construction, since the step portion with which an end of the stand portion of the bracket engages is formed in the spacer plate, when assembling, an axially supporting member in common with the bracket and the spacer plate can be easily inserted.

According to a fourth aspect of the present invention, as it depends from the second or the third aspect, the spacer plate is formed with a convex portion being able to engage with a recess formed in the side portion of the housing in an inner side.

In the above construction, since the convex portion which can engage with the recess formed in the side of the housing is formed in the inner side surface of the spacer plate, a temporal tacking can be performed when the spacer plate is supported to the housing.

According to a fifth aspect of the present invention, as it depends from the one aspect among the first aspect to the fourth aspect, the axially supporting portion in the side portion of the housing is shifted in the up and down direction with respect to the center of the housing.

In the above construction, since the stand portion of the bracket and the housing are axially supported in such a manner as to rotate in an up and down direction, the position of the housing can be adjusted with respect to the bracket in the up and down direction.

According to a sixth aspect of the present invention, as it depends from the one aspect among the first aspect to the fifth aspect, the base portion of the bracket is formed with a through hole being able to be supported to the vehicle body by a fastening member.

In the above construction, the housing can be supported to the vehicle body by the fastening member inserted through a through hole provided in a base of the bracket.

According to a seventh aspect of the present invention, as it depends from the one aspect among the first aspect to the sixth aspect, the base portion of the bracket is able to be supported to the vehicle body by an adherent tape coated with adhesive member at its both surfaces.

In the above construction, the base surface of the bracket can be supported to the vehicle body by the adherent tape coated with adhesive member at its both surfaces.

BRIEF DESCRIPTION OF THE ACCOMPANYING DRAWINGS

The above and further objects and novel features of the present invention will more fully appear from the following detailed description when the same is read in conjunction with the accompanying drawings, in which.

DESCRIPTION OF THE PREFERRED EMBODIMENTS

Figure 1:
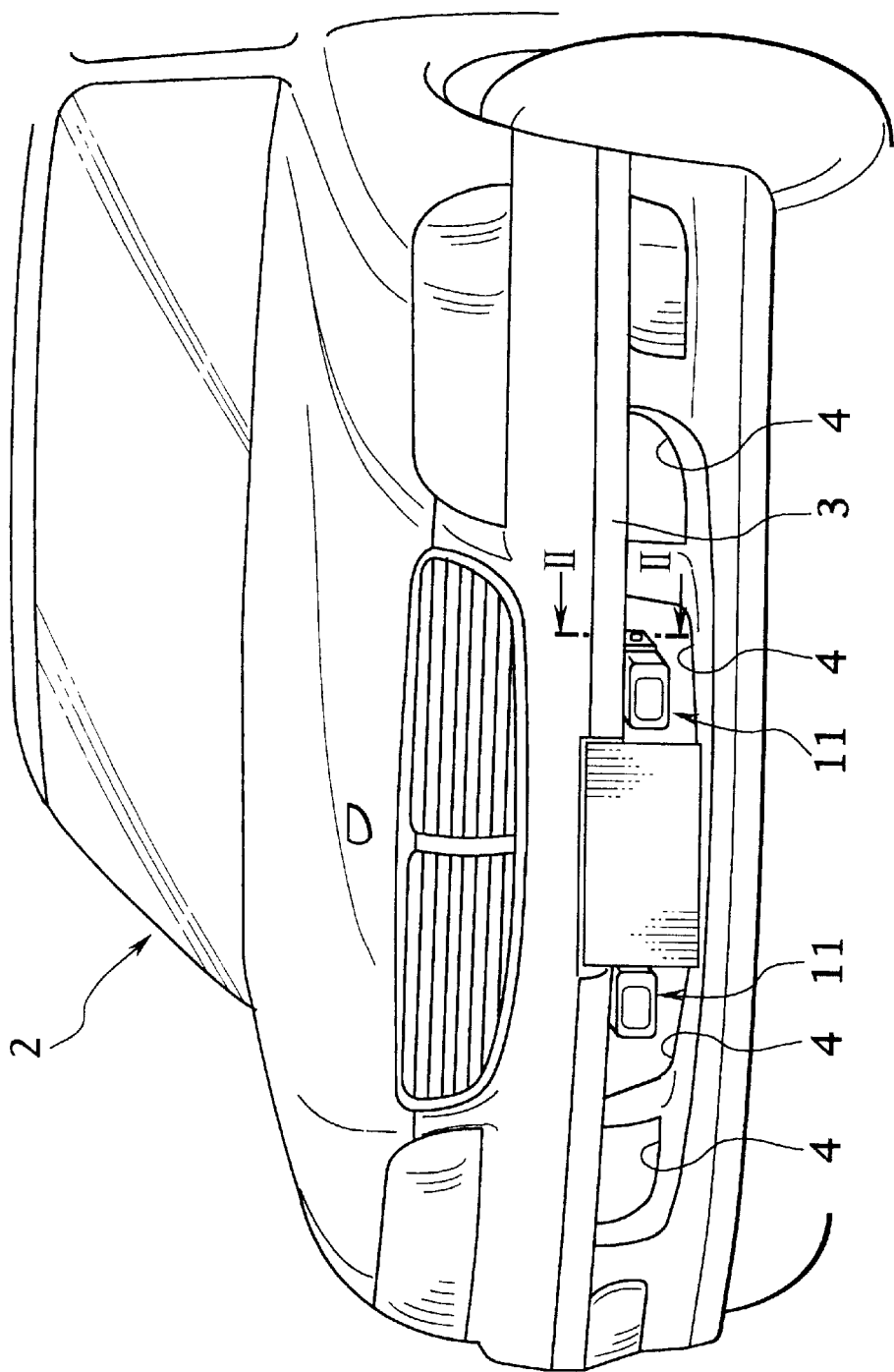
FIG. 1 is a perspective view which shows a mounting condition of an auxiliary light in accordance with the present invention.

FIGS. 1 to 6 show a first embodiment of the present invention.

An auxiliary light 11 comprises a housing 12 having a light element not shown within and an axially supporting portion 13 in a side portion 12a, and a bracket 14 having stand portions 14a which are axially supported to the side portion 12a of the housing 12 by means of the axially supporting portion 13 and a base portion 14c which can be suitably supported to a vehicle body not shown.

The housing 12 has a box like configuration formed substantially square and supports a vise 35 for fastening the light element not shown in the side portion 12a of the housing 12.

A center line 32 of a screw 25 in the up and down direction is shifted at a slight difference H in the up and down direction with respect to a center line 30 of the vice 35 or to a center line 30 of the housing 12 in the up and down direction, the center line 32 being formed in the stand portion 14a of the bracket 14.

Figure 2:
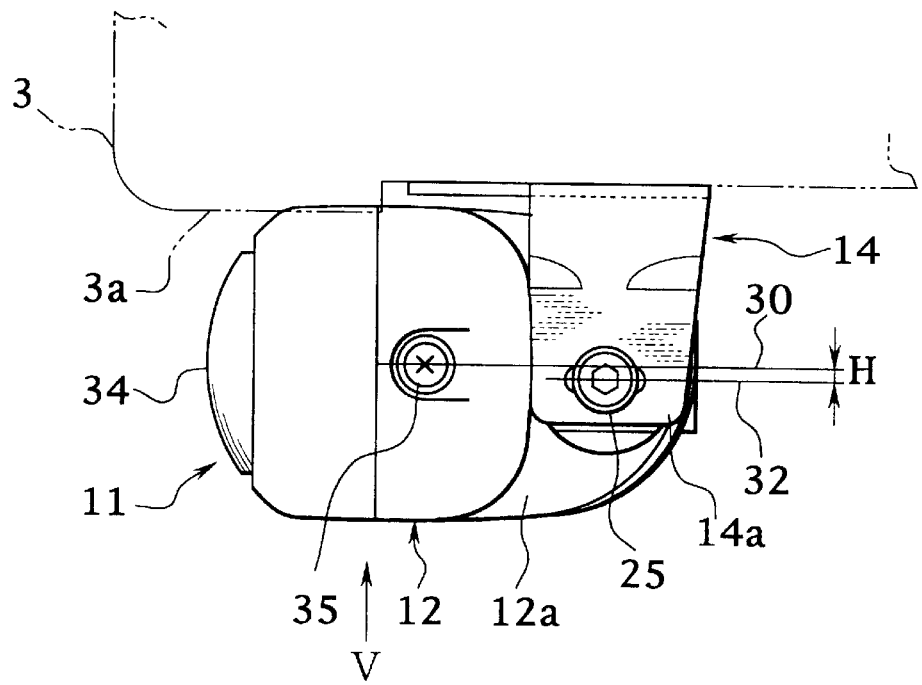
FIG. 2 is a side elevation view of the auxiliary light in accordance with the present invention taken along the line II—II in FIG. 1.

In accordance with the above structure, for example, in a position of the bracket 14 shown in FIG. 2, since a position of the vice 35 is upper at the difference H than a position of the screw 25, the auxiliary light 11 is arranged in a close or contact position to a lower surface 3a of the bumper 3.

Figure 3:
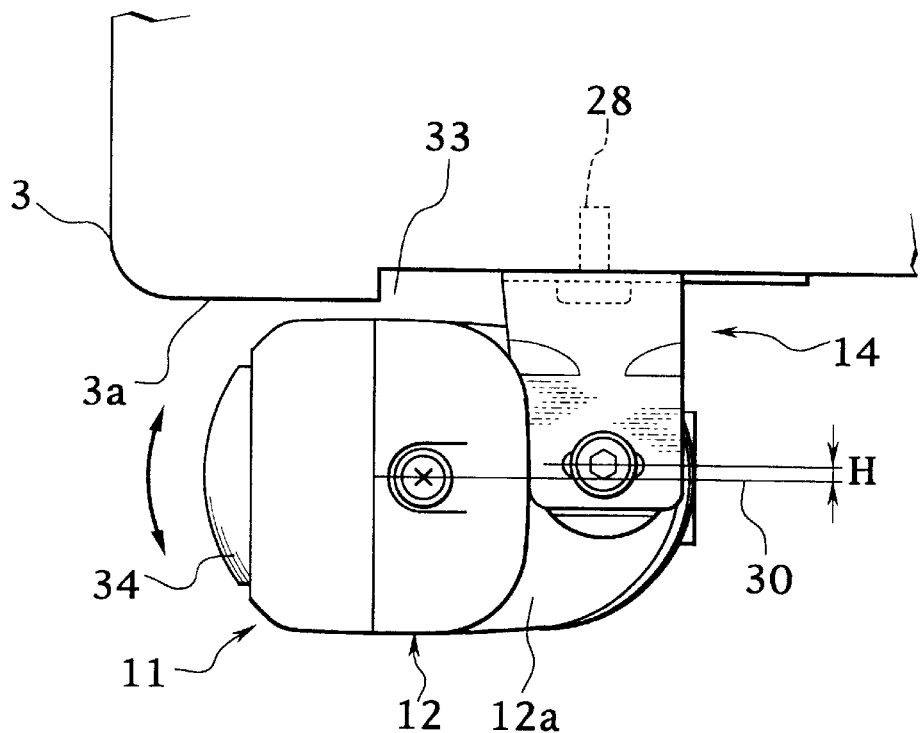
FIG. 3 is a side elevation view of the auxiliary light in accordance with the present invention in a condition that a position of the bracket in FIG. 2 is modified.

Further, in a position of the bracket 14 shown in FIG. 3 which corresponds to a position in which the bracket 14 is rotated at an angle of 180 degree with respect to the position shown in FIG. 2, since a position of the vice 35 is lower at the difference H than a position of the screw 25, it is designed that a gap 33 is made between the auxiliary light 11 and the lower surface 3a of the bumper 3.

Figure 4:
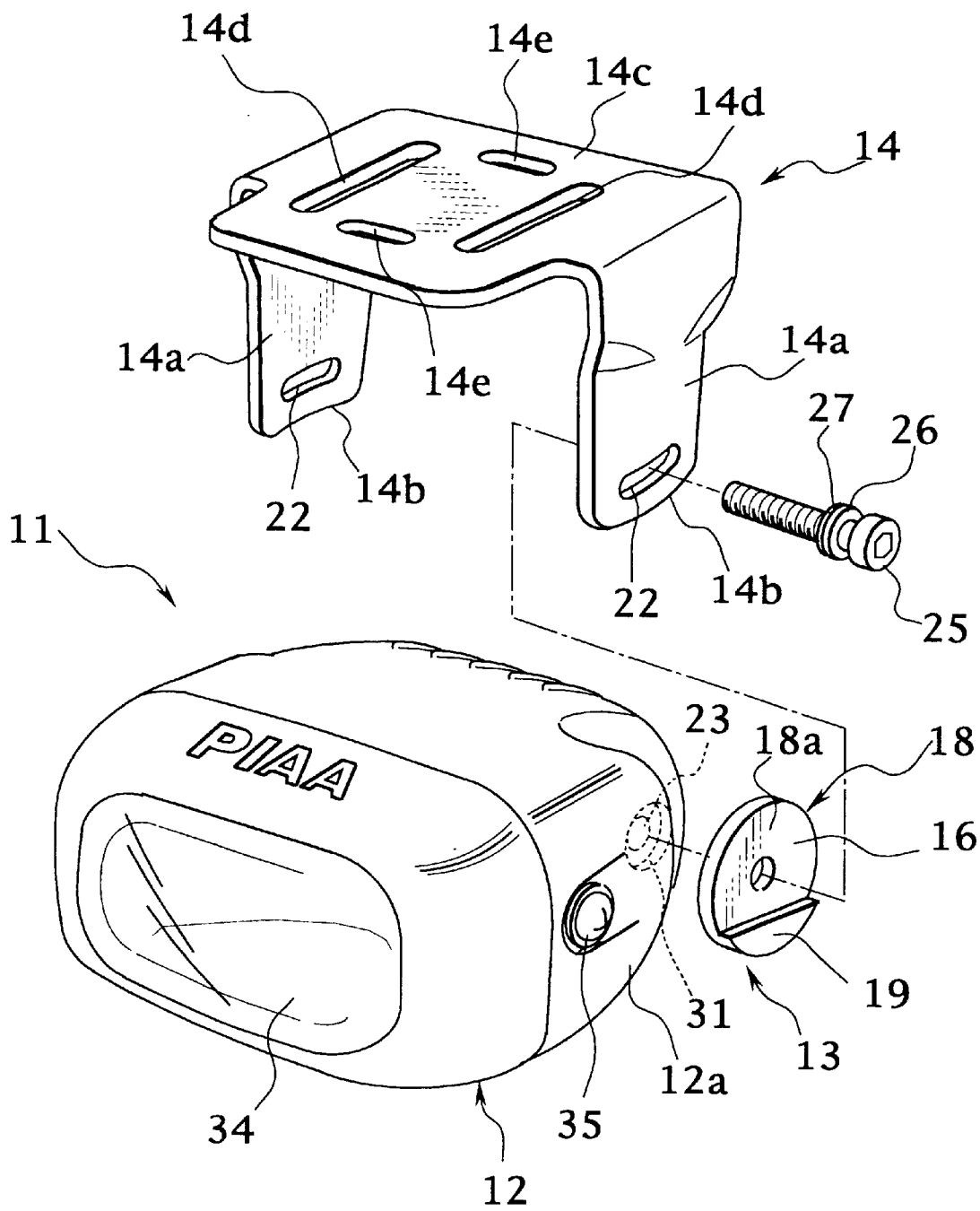
FIG. 4 is a exploded perspective view of FIG. 2.

In the above description, numeral 34 in FIGS. 2 to 4 denotes a lens which emits a light generated by the light element such of the auxiliary light 11 as a known bulb not shown based on a predetermined pattern.

In both the stand portion 14a of the bracket 14 and the axially supporting portion 13 of the housing 12, circular arc surface 16 and 17 each having a curvature R which has a center in the substantially center portion 15 in the right and left direction of the housing 12 are formed.

The circular arc surface 16 is formed in an outer side surface 18a of a spacer plate 18 which serves as the axially supporting portion 13.

In the outer side surface 18a of the spacer plate 18, a step portion 19 with which an end 14b of the stand portion 14a of the bracket 14 engages is formed.

Figure 6:
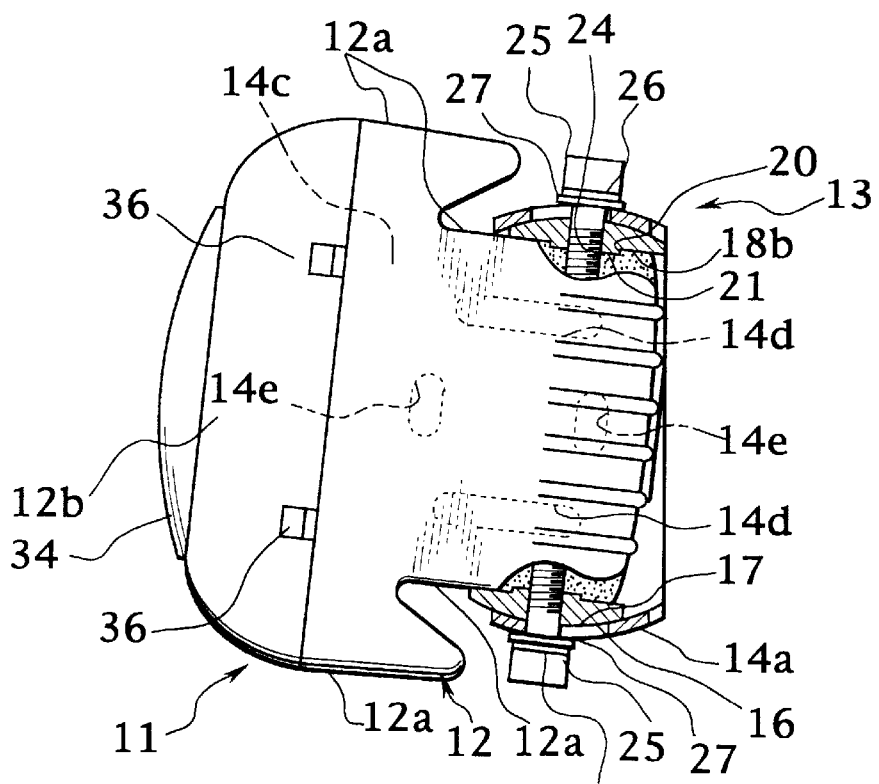
FIG. 6 is a bottom view which shows a condition that the auxiliary light shown in FIG. 5 is rotated in a right direction (an upward direction in FIG. 6) in which a part thereof is shown as a cross sectional view.

In an inner side surface 18b of the spacer plate 18, a convex portion 21 which can engage with a recess 20 formed on the side portion 12a of the housing 12 as shown in FIG. 6 is formed.

A female thread portion 24 is formed in the recess 20 of the side portion 12a of the housing 12, that is, the body of the recess 20 which is formed by that the body of the light element not shown covered by the housing 12 covers a through hole 23 of the housing 12 from the inside thereof.

Since a screw 25 which is driven by a hexagon coupling wrench not shown can thread into the female screw portion 24, a long hole 22 formed in the stand portion 14a of the bracket 14 and the through hole 23 formed in the side portion 12a of the housing 12 are axially supported in such a manner as to rotate in the up and down direction shown in an arrow of FIG. 3 with respect to each other.

Numerals 26 and 27 respectively denote a spring washer and a plane washer which are inserted into the screw 25.

The surface of the base 14c of the bracket 14 is formed as a plane, can be supported to the vehicle body by a pressure sensitive adhesive double coated tape not shown applied to the surface of the base 14c and can be supported to the vehicle body not shown by the vises 28 suitably inserted into a plurality of through holes 14d and 14e formed in the surface of the base 14c. The through hole 14d is formed to be long in the front and rear direction and is suitably applied to an adjustment of the light with respect to the bumper 3 in the front and rear direction and the through hole 14e is formed to be slightly long in the right and left direction and is suitably applied to an adjustment of the light with respect to the bumper 3 in the right and left direction.

Figure 5:
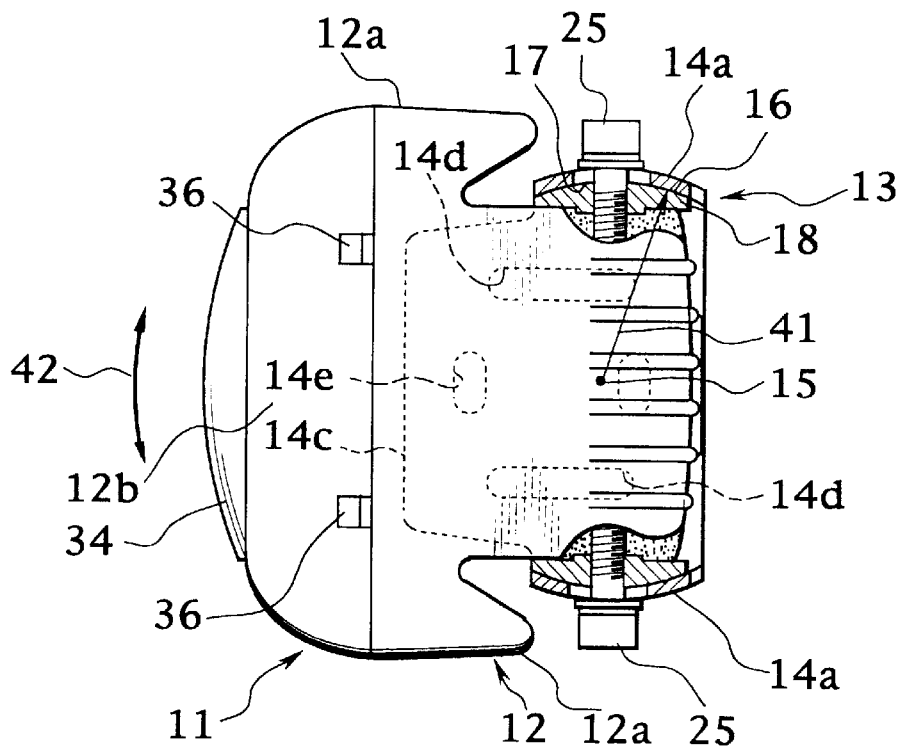
FIG. 5 is a bottom view as seen from an arrow V in FIG. 2 in which a part thereof is shown as a cross sectional view.

In FIGS. 5 and 6, numeral 36 denotes a drain hole for drawing water infiltrated into the housing 12 out, which is formed in two portions of the base surface 12b of the housing 12.

As mentioned above, in accordance with the present invention, as shown in FIG. 5, when light is moved to the direction shown as the arrow 42, namely, in the direction of right or left direction in a condition that the housing 12 including the light element within is directed forward, the circular arc portions 16 and 17 having the curvature R shown as the arrow 41 which has the center of the substantially center portion 15 in the right and left direction of the housing 12 formed in the outer side surface 18a of the spacer plate 18 are moved with respect to the surface 17 of the stand portion 14a of the bracket 14 suitably supported to the vehicle body so that the auxiliary light 11 can rotate in any of the right and left direction (in the embodiment of FIG. 6, the right direction (the upward direction in FIG. 6)).

Further, since the circular arc surface 16 is formed in the outer side surface 18a of the spacer plate 18 disposed in the side portion 12a of the housing 12, by replacing only the spacer plate 18 and the bracket 14 without replacing the housing 12, various surfaces having various curvatures can be obtained, that is, various rotating angles can be obtained so that the housing 12 has a flexibility.

Since the step portion 19 with which the end 14b of the stand portion 14a of the bracket 14 engages is formed in the spacer plate 18, in assembling, a common member for axially supporting both the bracket 14 and the spacer plate 18, that is, the screw 25 can be easily inserted into the female thread portion 24.

Since the convex portion 21 which can engage with the recess 20 formed in the side portion 12a of the housing 12 is formed in the inner side surface 18b of the spacer plate 18, a temporal tacking can be performed at a time of supporting the spacer plate 18 to the housing 12.

Since the stand portion 14a of the bracket 14 and the housing 12 are axially supported in such a manner as to rotate in the up and down direction, the position of the housing 12 can be adjusted in the up and down direction with respect to the bracket 14.

The surface of the base portion 14c of the bracket 14 can be supported to the vehicle body by the vises 28 inserted through the through holes 14d provided in the base portion 14c of the bracket 14, as shown in FIG. 3.

As another embodiment of the invention, the surface of the base portion 14c of the bracket 14 can be supported to the vehicle body by an adherent tape coated with adhesive member at its both surfaces or pressure sensitive adhesive double coated tapes.

While preferred embodiments of the present invention have been described using specific terms, such description is for illustrative purposes, and it is to be understood that changes and variations may be made without departing from the spirit or scope of the following claim.

What is claimed is:

1. An auxiliary light, comprising:
   a housing having a light element inside thereof and an axially supporting portion in a side portion thereof;
   a bracket having a base portion and a stand portion standing from the base portion, the stand portion axially supporting the side portion of the housing by the axially supporting portion and the base portion being capable of being suitably supported to a vehicle body;
   a fastening element operative to fasten the housing to the stand portion;
   each of the stand portion of the bracket and the axially supporting portion of the housing being formed with a circular arc portion;
   the circular arc portion formed in the axially supporting portion being a spacer plate disposed in the side portion of the housing and the circular arc portion being formed in an outer side surface of the spacer plate; and
   the spacer plate being formed with a step portion with which an end of the stand portion of the bracket engages.

2. The auxiliary light according to claim 1,
   wherein the spacer plate is formed with a convex portion in an inner side of the spacer plate, the convex portion being able to engage with a recess formed in the side portion of the housing.

3. The auxiliary light according to claim 2,
   wherein the axially supporting portion in the side portion of the housing is shifted in the vertical direction with respect to the center of the housing, whereby the vertical position of the housing relative to the bracket is shifted in response to the attitude of the housing as the housing is fastened to the stand portion of the bracket by the fastening element.

4. An auxiliary light, comprising:
   a housing having a light element inside thereof and an axially supporting portion in a side portion thereof;
   a bracket having a base portion and a stand portion standing from the base portion, the stand portion axially supporting the side portion of the housing by the axially supporting portion and the base portion being capable of being suitably supported to a vehicle body;
   a fastening element operative to fasten the housing to the stand portion;
   each of the stand portion of the bracket and the axially supporting portion of the housing being formed with a circular arc portion;
   the circular arc portion formed in the axially supporting portion is a spacer plate disposed in the side portion of the housing and the circular arc portion being formed in an outer side surface of the spacer plate; and
   the spacer plate being formed with a convex portion being able to engage with a recess formed in the side portion of the housing in an inner side.

5. The auxiliary light according to claim 4,
   wherein the axially supporting portion in the side portion of the housing is shifted in the vertical direction with respect to the center of the housing, whereby the vertical position of the housing relative to the bracket is shifted in response to the attitude of the housing as the housing is fastened to the stand portion of the bracket by the fastening element.

* * * * *